US009519159B1

(12) United States Patent
King

(10) Patent No.: US 9,519,159 B1
(45) Date of Patent: Dec. 13, 2016

(54) HUNTING VISORED EYE SHIELD

(71) Applicant: Joseph Scott King, Vicksburg, MI (US)

(72) Inventor: Joseph Scott King, Vicksburg, MI (US)

(73) Assignee: Joseph Scott King, Vicksburg, MI (US)

( * ) Notice: Subject to any disclaimer, the term of this patent is extended or adjusted under 35 U.S.C. 154(b) by 0 days.

(21) Appl. No.: 14/939,972

(22) Filed: Nov. 12, 2015

(51) Int. Cl.
*G02C 7/16* (2006.01)
*G02C 11/00* (2006.01)
*G02C 5/12* (2006.01)
*G02C 3/00* (2006.01)

(52) U.S. Cl.
CPC ............... *G02C 7/16* (2013.01); *G02C 3/003* (2013.01); *G02C 5/12* (2013.01); *G02C 11/00* (2013.01)

(58) Field of Classification Search
CPC ............ G02C 7/10; G02C 7/104; G02C 7/16; G02C 7/165
USPC ............................... 351/44, 45, 46
See application file for complete search history.

(56) References Cited

U.S. PATENT DOCUMENTS

| | | |
|---|---|---|
| 1,959,915 A | 9/1932 | Guthrie |
| 4,812,031 A | 3/1989 | Evans |
| 4,837,862 A * | 6/1989 | Heil ............ A61F 9/045 2/12 |
| 4,869,584 A | 9/1989 | Dion |
| D309,618 S | 7/1990 | Evans |
| 5,521,655 A | 5/1996 | Rhoads |
| 5,767,933 A | 6/1998 | Hagen |
| 6,065,833 A | 5/2000 | Tiano |
| 2011/0289641 A1 * | 12/2011 | Pisarczyk ............ G02C 11/12 2/13 |
| 2014/0268030 A1 | 9/2014 | Castacane et al. |

FOREIGN PATENT DOCUMENTS

GB 2097950 * 11/1982 ............ G02C 7/16
WO WO0108219 A1 10/2001

OTHER PUBLICATIONS

Miles, Charles, Indian and Eskimo Artifacts of North America, Chicago: Henry Rignery Company 1963, p. 128.

* cited by examiner

Primary Examiner — Huy K Mai

(57) ABSTRACT

An eyewear device for the primary purpose of concealing and camouflaging the wearer's eyes and eye movement during hunting activities. The eyewear device comprises an opaque shield and visor that covers, shades, and shadows the wearer's eyes and at the same time it greatly reduces ambient light that might be reflected from the eye so they are not visible to wildlife. The shield is designed with elongated openings that allow the wearer to have significantly unencumbered vision in a variety of daylight hunting conditions. The eyewear device's performance cannot be affected by fogging, scratching or precipitation. Furthermore the eyewear device's one-piece flexible design makes it durable enough to withstand the riggers of hunting.

19 Claims, 3 Drawing Sheets

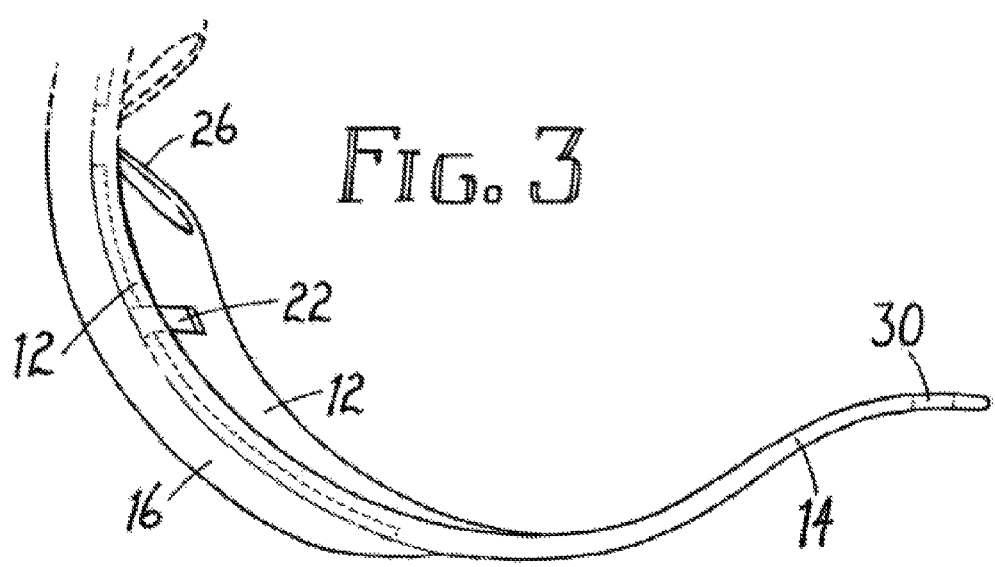

HUNTING VISORED EYE SHIELD

BACKGROUND

Prior Art

The following is a tabulation of some prior art that presently appears relevant:

U.S. Patents

| Pat. No. | Kind Code | Issue Date | Patentee |
|---|---|---|---|
| 6,065,833 | B1 | May 23, 2000 | Tiano |
| 5,767,933 | B1 | Jun. 16, 1998 | Hagan |
| 5,521,655 | B1 | May 28, 1996 | Rhoads |
| D309,681 | S | Jul. 31, 1990 | Evans |
| 4,869,584 | B1 | Sep. 26, 1989 | Dion |
| 4,812,031 | B1 | Mar. 14, 1989 | Evans |
| 1,959,915 | B1 | Sep. 22, 1932 | Guthrie |

U.S. Patent Application Publications

| Application Number | Kind Code | Publ. Date | Applicant |
|---|---|---|---|
| 20140268030 | A1 | Sep. 18, 2014 | Castacane/Kelman |

Foreign Patent Documents

| Foreign Doc. Nr. | Cntry Code | Kind Code | Publ. Date | App or Patentee |
|---|---|---|---|---|
| WO 200108219 A1 | W0 | A1 | Oct. 08, 2001 | Voyant Com /Kelman |

NONPATENT LITERATURE DOCUMENTS

Antiquespectacles.com—Antique Spectacles and Other Vision Aids, Online Museum and Encyclopedia of Visual Aids, curator David A Fleishman M. D.

Ijaak.com—"Ijaak" plastic decorative sunglasses.

Igaaks.com—designer Paul Celmer—"Igaaks" metal decorative sunglasses.

Miles, Charles, Indian & Eskimo Artifacts of North America, Chicago: Henry Rignery Company 1963.

BACKGROUND OF THE INVENTION

1. Field of the Invention

The present invention relates to camouflage gear for the upper face region. More specifically, the present invention relates to the camouflage eyewear that conceals the eyes and reduces direct light and ambient light that might be reflected from the eyes in the form of wrap around eyeglass shaped shield with an attached visor and elongated openings for viewing.

2. Discussion of Background

In hunting situations that require close proximity to potential prey, hunters will attempt to blend into their surroundings. This includes concealing one's face, in particular the eyes. It is debatable whether it is the whites of the eyes, the glint or reflection of ambient light or direct light from the eyes, or the reflection of light in spectrums outside the visual capacity of humans. Very often wild game such as deer, turkey and coyote are tipped off or spooked when eye contact is made. In the case of the wild turkey they are able to see a blinking eye at a great distance. Therefore, when hunting any wild game at close range it is important to conceal and camouflage one's eyes as well as one's body in its entirety.

Previous attempts at camouflage eyewear have seen limited success due to various drawbacks and limitations. One such technique is to apply camouflage netting to one's hat or drape the netting over one's entire head. While this type of device works well to conceal and camouflage the hunter's eyes, it is cumbersome to use and often times adversely effects shooting a firearm or bow in an accurate manner. Netting rustles and makes noises that impair a hunter's own ability to hear animal sounds or animal movements. Netting also decreases light to the eye, which makes it difficult to see in low light conditions when most game animals are traveling. In bright sunlight the loose netting can create glare that greatly decreases visibility as well.

Another device designed by Evans, U.S. Pat. No. 4,812,031 utilizes camouflage netting attached to wire frames inserted into traditional eyeglasses. While Evans' design solves the cumbersome problems occurring with camouflage netting draped over one's face, it still does not solve the issue of restricting vision in low light conditions making the sites on a firearm and archery equipment difficult to acquire. Furthermore the netting is prone to snagging or accidental stretching while mobile in the field or if not stored properly.

A device designed by Tiano, U.S. Pat. No. 6,065,833 and a device by Hagan, U.S. Pat. No. 5,767,933 both attempt to protect the eyes with safety style lenses. Tiano utilizes a goggle style device designed not to fog which has an attaching camouflage veil. Hagan utilizes a safety-type-glasses device that is covered with adhesive camouflage stickers. Both devices do well with protecting the wearer's eyes, but unfortunately do not conceal eye movement. The above devices are also prone to scratching, which causes glare that impairs the wearer's vision. Another drawback to such devices for hunting purposes is that their smooth lenses reflect light causing a shine or glint that game animals will be alerted to, thus defeating their intended purpose.

In the device by Rhoad, U.S. Pat. No. 5,521,655 a unidirectional panel is utilized which consists of a plastic lens material that conceals and camouflages the wearer's eyes. The drawback to this particular design is that the tinting created in the lens material through the process of camouflaging the lenses also impairs distance vision and vision in low light applications. Furthermore the lenses are very susceptible to scratching, impairing the wearer's vision even more. Fogging of the lenses is another concern with this design as it is generally worn in conjunction with a face mask that directs exhaled breath directly below the lenses. Cleaning fogged lenses while in the act of hunting is not an acceptable solution.

In actual hunting situations having the ability to visually identify potential prey is not enough. In some instances it is imperative that the hunter be able to identify specific game species, the sex of the game animal and in some cases to determine the age of the animal. Some states regulate whitetail deer hunting harvests by the number of antler points. The taking of an animal with the wrong number of points can be an unethical as well as illegal and is punishable by law. Removing eyewear to see clearly for observational purposes or to make a clear shot in the act of hunting can, in many instances, alert potential game to your presence, thus defeating its intended purpose.

In addition to the eyewear discussed above it would be remiss of me to not include eyewear called "iggaak" designed by the Inuit peoples of the far northern hemisphere. Inuit utilized this type of eyewear, similar to snow goggles to protect the eyes from snow blindness, wind and precipitation. The eyewear consisted of a bone or wood panel that covered the eye areas completely. The panel would be relieved with very thin, forward looking horizontal apertures for viewing from and fastened to the wearer's face with band or strap. There is no evidence that this type of eyewear was utilized to camouflage and conceal the wearer's eyes from game animals or utilized specifically for hunting. In fact the small sizes of the apertures would actually inhibit the wearer's vision for this purpose. Two modern versions of the iggaak snow goggles are currently being produced as decorative sunglasses, but I am unable to find any related patent or patent application. The applicant is unaware of an attempt to produce camouflage eyewear for concealing the wearer's eyes from game animals by this method.

As listed above, several types of hunting eyewear have been proposed, designed, and developed with hunting applications in mind, however they have all failed to fully and successfully deal with the many different conditions specific to the multitude of hunting applications. Current commercial devices, as well as past inventions, suffer from a number of disadvantages:

(a) Loose netting creates noises that impair the hearing of the wearer.

(b) Loose netting and netting in eyewear impairs vision in both low light and in direct light conditions.

(c.) Loose netting and netting in eyewear can become snagged or torn in the riggers of hunting.

(d) Clear lenses in eyewear allow wildlife to detect eyes, eye movements and glint of the hunter's eye.

(e) Shiny smooth surfaces of traditional lensed eyewear produce a glint or glare that is detectable by wild animals.

(f) Eyewear with tinted lenses impairs the wearer's vision in low light conditions.

(g) Unidirectional type lenses with printed designs and all types of netting impair distance vision and ability to discern details of individual animals.

(h) Lensed eyewear is easily scratched, impairing the vision of the wearer.

(i) Lensed eyewear is easily fogged, especially when worn in conjunction with other hunting paraphernalia thus impairing the vision of the wearer.

(j) Lensed eyewear requires special care techniques for cleaning so as to not damage the lenses.

(k) Traditional eyeglass designs allow direct light or ambient light to enter the temporal region that creates glare on the inside of the lenses.

(l) Traditional eyewear is collapsible and has hinges, creating weakened areas that are likely to break in the riggers of hunting.

SUMMARY

In accordance with one embodiment, an eyewear device that comprises a shield with a plurality of elongated openings and a visor integral to the shield, extending outward and spanning the elongated openings in the shield. Integral to each end of the shield and extending above the wearer's ears are a set of appendages. The device has means for blocking direct light and ambient light from the wearer's eyes, said means comprising an opaque molded plastic that covers, shades, and shadows the wearer's eyes so they are not visible to wildlife, while providing the wearer significantly unencumbered vision through the elongated openings.

Advantages

Accordingly, several advantages of one or more aspects are as follows: to provide an eyewear device that can conceal and camouflages the wearer's eyes from game animals in a variety of daylight hunting conditions. Conditions including lowlight conditions near dusk and dawn, bright sunlight during sunrise and during sunsets, and bright midday sun in snow conditions. The eyewear device is strong yet flexible making it durable enough to withstand the riggers of hunting. The eyewear device requires no maintenance and is inexpensive compared to existing hunting eyewear currently available. The eyewear device does all of the above without impairing the vision of the wearer. Other advantages of one or more aspects will be apparent from a consideration of the drawings and ensuing description.

DRAWING

Figures

In the drawings, symmetrically related parts have identical numbers.

FIG. 3 is a top view of the present invention showing one-half of the symmetrical embodiment of the invention.

DRAWINGS

Reference Numbers

| | |
|---|---|
| 10 | eyewear device |
| 12 | shield |
| 14 | appendage |
| 16 | visor |
| 20 | horizontal elongated opening |
| 22 | vertical elongated opening |
| 26 | nose rest |
| 30 | lanyard hole |

A DETAILED DESCRIPTION

Figure 1:
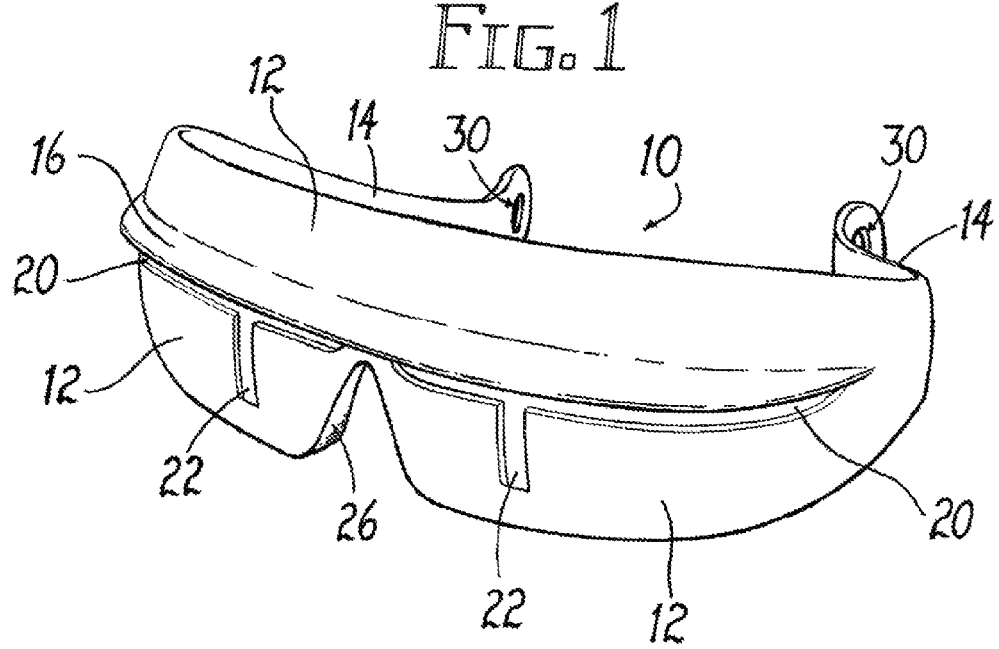
FIG. 1 is a perspective view of the present invention showing the front of the shield, visor, elongated openings, nose rest and the appendages.
Figure 2:
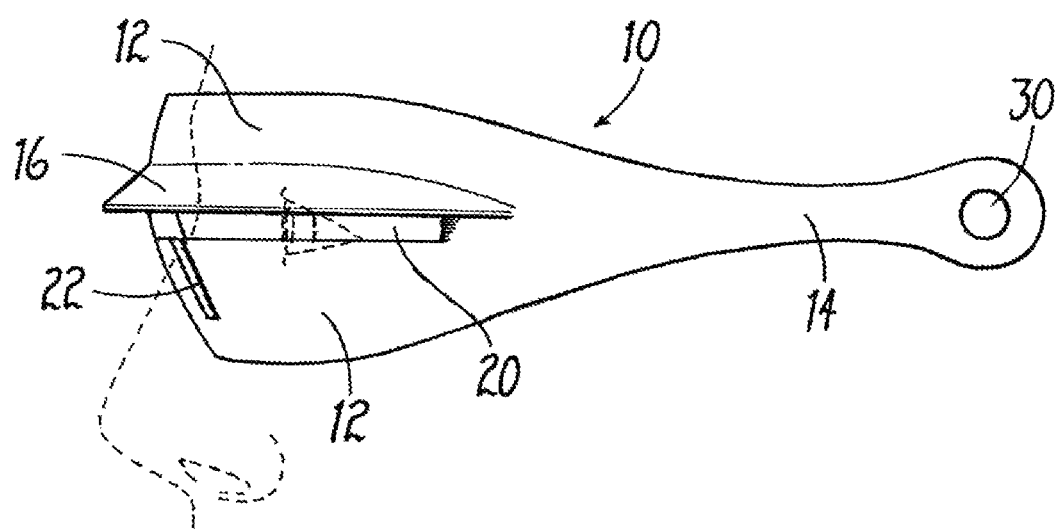
FIG. 2 is an outer left side view of the present invention showing how the eye, temple region and upper portion of the face are concealed.

One embodiment of the eyewear device 10 is illustrated in FIG. 1 (perspective view) and FIG. 2 (side view) that is comprised of shield 12 that wraps around the upper face region substantially covering the wearer's eye region including the temporal region of the wearer's face. A set of horizontal openings 20 and vertical elongated openings 22 provide a means from which the wearer can view. The horizontal elongated openings 20 and vertical elongated openings 22 are integral to the shield 10. In a preferred embodiment the visible parts remaining of the wearer's eye, part of the iris and pupils, in the horizontal elongated opening 20 are concealed by shadow and shade, from game animals or anyone viewing the wearer. Thus, eye movements of the wearer cannot be seen.

The wrap-around feature as seen in FIGS. 1, 2, and 3, also allows the wearer to have an uninterrupted view and unencumbered peripheral vision through the horizontal elongated openings 20. In a preferred embodiment the horizontal elongated openings 20 follow the contour of the shield 12 around the wearer's face giving the wearer relatively unencumbered peripheral vision. It is important for the wearer to be able to have the ability to acquire movement of game animals in their peripheral vision.

Furthermore a feature illustrated in FIGS. 1 and 2 of the present invention is a visor 16 integral and extending forward from the shield 12. The visor 16 blocks sunlight and casts a shadow over the horizontal elongated openings 20 and the eyes of the wearer, thus further concealing the eyes in the horizontal elongated openings 20 of the shield 12. In a preferred embodiment the visor 16 spans the entire length of the horizontal elongated openings 20. It is important for a hunter's eyes to be shaded as to inhibit wildlife from seeing glint or eye movement, and it is equally important for hunter's eyes to be shaded as to protect the eyes from glare and bright light, especially in the act of aiming and shooting.

Another feature illustrated in FIGS. 1 and 2 is the two vertical elongated openings 22 that extend down from each horizontal elongated opening 20 in the frontal portion of the left and right side of the shield 12 respectively. In a preferred embodiment the vertical elongated openings 22 are spaced according to the average distance between the human eye, thus accommodating the wearer with the ability to look down with minimal head movement when utilizing a game call or acquiring hunting apparatus in the act of hunting.

As illustrated in FIGS. 1 and 2, the present invention has a nose rest 26 integral into the bottom center of the shield 12 that works in conjunction with two appendages 14 that extend over the ears of the wearer to keep the eyewear attached to the wearer's head. In a preferred embodiment the appendages 14 are rigidly and integrally affixed to the ends of the shield.

The appendages 14 are further relieved with a lanyard hole 30 at the end of each appendage respectively. In a preferred embodiment the lanyard hole 30 is designed for a lanyard to be attached to each side for the purpose of hanging the eyewear device 10 from the wearer's neck for ease of use and quick accessibility when walking to and from a hunting site.

The eyewear device 10 carries a camouflage finish over its entirety. This camouflage finish may include a camouflage design, camouflage pattern, or uniform camouflage hue. The camouflage design is a patented, trademarked or licensed commercial design applied through a hydrographic or similar process. A random process of camouflaging can be applied in the plastic injection molding process created with dyes or colorants. Lastly a uniform camouflage hue is as undetectable as any other design if an earth tone is used in the plastic molding process. In the case of later two possibilities they could be applied in conjunction with a simple textural relief design of leaves, bark, twigs and the like for surface texture that will break up the flat surfaces of the eyewear. To make this happen a textural scan can be worked into the surface of the mold. Regardless of what technique is used a flat finish is necessary and should be applied in either with a chemical etch or by sandblasting of the mold tool.

The eyewear device 10 is an integrated, one-piece design that does not comprise a traditional eyeglass frame for supporting lenses nor does this design comprise lenses but instead is a single unit of a homogenous material. In a preferred embodiment, this one-piece design allows the eyewear to be made of a flexible and durable rubberized plastic or equivalent, manufactured thru a plastic injection mold process.

Furthermore, with the lack of lenses, there is not a possibility of a visual impairment due to scratched lenses or snagged netting. Also the simplicity and durability of this design lends itself to the ease of care.

In addition, eyewear with out lenses will not fog up like traditional glasses and goggles. Having clear unencumbered vision is paramount while in the presence or when viewing wildlife animals. Simply moving a hand to remove or clean fogged glasses can result in the spooking of wildlife.

Advantages

From the description above, a number of advantages of the preferred embodiment of my eyewear device become evident:

(a) A one-piece, plastic eyewear design does not require as much tooling, nor does it require any assembly of parts, making it more economical to manufacture than other types of hunting eyewear, as it can be molded in one piece.

(b) A plastic eyewear design can be colored during the plastic injection mold process, therefore making the manufacturing process, as a whole is significantly shortened—and therefore cheaper —when compared to designs that are molded and colored separately.

(c) A matte finish to the eyewear can be achieved during the tooling process of the mold either by acid etching or sand blasting the mold, eliminating the need for a separate facility and manufacturing step.

(d) A one-piece, eyewear design made of flexible plastic is much more durable and able to withstand the riggers of hunting without getting damaged in the field like traditional glasses.

(e) The performance of an eyewear device without lenses cannot be diminished through fogging, being scratched or by precipitation while hunting.

(f) The performance of an eyewear device without lenses or netting will not impair distance vision.

(g) Eyewear with a shield, a visor, and elongated openings for viewing perform well in all light conditions from low light near dusk and dawn to bright mid-day sunlight and glare in snowy conditions.

(h) Eyewear with a shield, a visor, and elongated openings for viewing that wrap around the face of the wearer conceal and camouflages the wearer's eyes thoroughly from game animals.

(i) Eyewear with elongated openings for viewing that wrap around the face of the wearer allows unencumbered peripheral vision.

CONCLUSION, RAMIFICATIONS, AND SCOPE

Accordingly, the reader will see that the eyewear device of the preferred embodiment can be used to conceal and camouflage a hunter's eyes. They are easy to maintain, durable, and versatile for use in many hunting situations. In addition, this eyewear effectively blocks direct sun light and shades the eyes effectively protecting the eyes of the wearer. Furthermore the Hunting Visored Eye Shield have the additional advantages that:

- it permits the production of the eyewear device without requiring the manufacturer to assemble any parts;
- it allows the eyewear device to be colored in a variety of colors; it allows the eyewear device to be multicolored;
- it allows the eyewear device to be colored by the manufacturer without any specialized processes or separate manufacturing facilities;
- it provides an eyewear device with superior structural durability;
- it provides and eyewear device that can not become inoperable due to fogging, scratched lenses and precipitation;
- it provides an eyewear device with a superior clear and unobstructed view in extreme light conditions;
- it provides an eyewear device that allows the wearer to have unencumbered peripheral vision; and
- it provides an eyewear device that can be utilized as eye protection from sunlight in activities other than hunting.

Although the description above contains many specificities these should not be construed as limiting the scope of the preferred embodiment but merely as providing some illustrations of some of several embodiments. Changes in the eyewear by one of ordinary skills in the art with regards to shape and size and arrangement of the shield, visor, elongated openings, and camouflage design can be made to the invention without departing from its spirit and scope as set forth by the claims.

Thus the scope of the embodiments should be determined by the appended claims and their legal equivalents, rather than by the examples given.

What is claimed is:

1. An eyewear device to conceal the eyes of a wearer from wildlife while allowing the wearer to see, said device comprising:
   a shield with a plurality of elongated openings there in;
   a visor integral to said shield spanning said elongated openings in said shield;
   a set of appendages integral to each end of said shield extending above said wearer's ears;
   means for blocking direct light and ambient light from said wearer's eyes, said means comprising an opaque material that covers, shades and shadows said wearer's eyes; and
   concealing means so that said eyes are not visible to wildlife, while allowing the wearer to view through said elongated openings, said means comprising said shield and said visor that covers, shades and shadows said wearer's eyes.

2. An eyewear device, as recited in claim 1, wherein said shield wraps around the face of said wearer so that the wearer's eyes are substantially concealed.

3. An eyewear device, as recited in claim 1, wherein said elongated openings in said shield are oriented horizontally and vertically in relationship to an upright positioned wearer.

4. An eyewear device, as recited in claim 3, wherein said horizontal elongated openings in said shield provide a substantially unobstructed horizontal field view to said wearer.

5. An eyewear device, as recited in claim 3, wherein said horizontal elongated openings in said shield provide substantially unobstructed peripheral field of vision to said wearer.

6. An eyewear device, as recited in claim 3, wherein said vertical elongated openings in said shield provide a general forward looking and substantially unobstructed field of view below said field of view of said horizontal elongated opening to said wearer.

7. An eyewear device, as recited in claim 1, wherein said shield, substantially reduces ambient light that hits the wearer's eyes thus reducing light reflection from said wearer's eyes in said elongated openings.

8. An eyewear device, as recited in claim 7, wherein said shield substantially protects said wearer's eyes from glare.

9. An eyewear device, as recited in claim 1, wherein said visor facilitates the blocking of sunlight thus shading or casting a shadow over said wearer's eyes in said apertures.

10. An eyewear device, as recited in claim 9, wherein said visor, substantially reduces ambient light that hits the wearer's eyes thus reducing light reflection from said wearer's eyes in said apertures.

11. An eyewear device, as recited in claim 1, further comprising of a nose rest integral to said shield.

12. An eyewear device, as recited in claim 11, wherein said nose rest having means of support thereto.

13. An eyewear device, as recited in claim 1, wherein said integral appendages on said shield extend above the ears having means of support thereto.

14. An eyewear device, as recited in claim 13, wherein said appendages include two openings having means for securing the device to said wearer with a length of cording or other type lanyard device.

15. An eyewear device, as recited in claim 1, wherein said eyewear device carries a camouflage finish.

16. An eyewear device, as recited in claim 15, wherein said camouflage finish may include camouflage design, camouflage pattern, or uniform camouflage hue.

17. An eyewear device, as recited in claim 16, wherein said camouflage design is a registered patent or trademark or commercial design.

18. An eyewear device, as recited in claim 16, wherein said camouflage pattern is a design created with dyes or colorant, separately or in combination with sandblasting, media-blasting, or chemical etch of the tool in the plastic injection mold manufacturing process.

19. An eyewear device, as recited in claim 16, wherein said uniform camouflage hue is a design created with dyes or colorant, separately or in combination with sandblasting, media-blasting, or chemical etch of the tool in the plastic injection mold manufacturing process.

* * * * *